United States Patent
Duplessis et al.

(10) Patent No.: US 8,185,888 B2
(45) Date of Patent: May 22, 2012

(54) SOFTWARE EXECUTION WITH MINIMAL IMPACT DEPLOYMENT

(75) Inventors: Jean-Pierre Duplessis, Redmond, WA (US); Kraig S. Rury, Seattle, WA (US); Anthony C. Romano, Kirkland, WA (US); Theodore H. Roberts, Issaquah, WA (US); William N. Hanlon, Bellevue, WA (US); Paul S. Harrington, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1385 days.

(21) Appl. No.: 11/758,627

(22) Filed: Jun. 5, 2007

(65) Prior Publication Data
US 2008/0307411 A1 Dec. 11, 2008

(51) Int. Cl.
*G06F 9/445* (2006.01)
(52) U.S. Cl. ........ 717/174; 717/121; 717/175; 717/176; 717/177; 717/178
(58) Field of Classification Search .................. 717/172, 717/178, 121, 175, 176, 177
See application file for complete search history.

(56) References Cited

U.S. PATENT DOCUMENTS

| | | | | |
|---|---|---|---|---|
| 5,257,379 A * | 10/1993 | Cwiakala et al. | .................. | 713/1 |
| 5,499,357 A * | 3/1996 | Sonty et al. | .................... | 710/104 |
| 6,519,643 B1 * | 2/2003 | Foulkes et al. | ................ | 709/227 |
| 6,636,961 B1 * | 10/2003 | Braun et al. | ....................... | 713/1 |
| 6,807,631 B2 * | 10/2004 | Fuller et al. | .................... | 713/100 |
| 7,080,159 B2 * | 7/2006 | Chu et al. | ........................ | 709/246 |
| 7,131,020 B2 * | 10/2006 | Moll et al. | ..................... | 713/375 |
| 7,191,435 B2 * | 3/2007 | Lau et al. | ........................ | 717/168 |
| 7,328,427 B2 * | 2/2008 | Pullara | .......................... | 717/121 |
| 7,680,758 B2 * | 3/2010 | Laborczfalvi et al. | . | 707/999.001 |
| 2003/0002492 A1 * | 1/2003 | Gallagher et al. | ............ | 370/360 |
| 2006/0059458 A1 * | 3/2006 | Plummer | ...................... | 717/108 |
| 2007/0038679 A1 * | 2/2007 | Ramkumar et al. | .......... | 707/200 |
| 2010/0031145 A1 * | 2/2010 | Haggis et al. | .................. | 715/716 |

OTHER PUBLICATIONS

Paal et al., "A Cross-Platform Application Environment for Nomadic Desktop Computing", 2004.*
Moore et al., "Migrating WebLogic Applications to WebSphere Advanced Edition V4", 2002.*
Meijer et al., "Overcoming Independent Extensibility Challenges", 2002.*
Goscinski et al., "Distributed Ant: A system to Support Application Deployment in the Grid", 2004.*

\* cited by examiner

*Primary Examiner* — Phillip Nguyen

(57) ABSTRACT

Software execution with minimal impact deployment allows software to be executed on a system without first running a conventional installation process. Techniques are used to avoid any requirement of writing settings to restricted areas of operating system maintained data stores.

13 Claims, 6 Drawing Sheets

SOFTWARE EXECUTION WITH MINIMAL IMPACT DEPLOYMENT

BACKGROUND

Software applications often require the use of resources, such as operating system files, files shared with other applications, hardware devices, etc. The location of these files and devices may vary from system to system and, as a result, installation programs for software often determine and store settings indicating the locations of the resources at the time of installation. Installation programs may also save other settings.

These settings are often kept in restricted-access data stores maintained by an operating system. To add or modify settings in these areas often requires elevated or administrative security rights. Performing normal operations with elevated or administrative rights may lead to security risks, including increased exposure to viruses, Trojan horses, and other malicious software. As a result, some organizations do not provide users with elevated or administrative rights. It may be necessary for a user to either log in with elevated security rights or to have an administrator log in to enable the software installation to complete.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In accordance with one implementation presented herein, a software application, or "original software," is processed. If the original software has dependencies on resources included with the original software, the resources are copied to a common location, which may be one or more directories in a file system, one or more files, a device such as a flash drive, or any other location or locations capable of storing the resources. References to those resources in the original software are updated to reference the common location. The resulting "prepared software" can be run on another device (a "target computer") without requiring an installation process and without making permanent changes to the target computer's restricted-access data store.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of example implementations and is not intended to represent the only forms in which software execution with minimal impact deployment may be constructed or utilized. The description sets forth the functions of example implementations and the sequence of steps for constructing and operating the examples. However, the same or equivalent functions and sequences may be accomplished by alternate implementations.

Described herein are, among other things, examples of various technologies and techniques that allow software execution with minimal impact deployment. Although the examples are described and illustrated herein as being implemented in a personal computer system, the system described is provided as an example and not a limitation. As those skilled in the art will appreciate, the present examples are suitable for application in a variety of different types of systems.

In some implementations, original software is first preprocessed to create what will be referenced herein as "prepared software." First the original software is installed on a host computer. The original software is then executed, and user settings or other configuration information is saved to a configuration file. Files that make up the original software, associated data files, and configuration files are then analyzed for dependency information and copied to a common location. The dependency information is then used to determine if additional files should be copied to the common location. References to components or data store entries that are hard-coded in the original software are then replaced, or "tokenized," with abstract place-holders or "tokens" in the prepared software.

Once the original software has been preprocessed, the prepared software may be made accessible, by copying or sharing the files, for example, from the common location to a target computer, where the prepared software may be executed without being installed. At runtime, the tokens that replaced hard-coded references to components or data store entries are replaced with values appropriate for the target computer, allowing the prepared software to execute properly.

Figure 1:
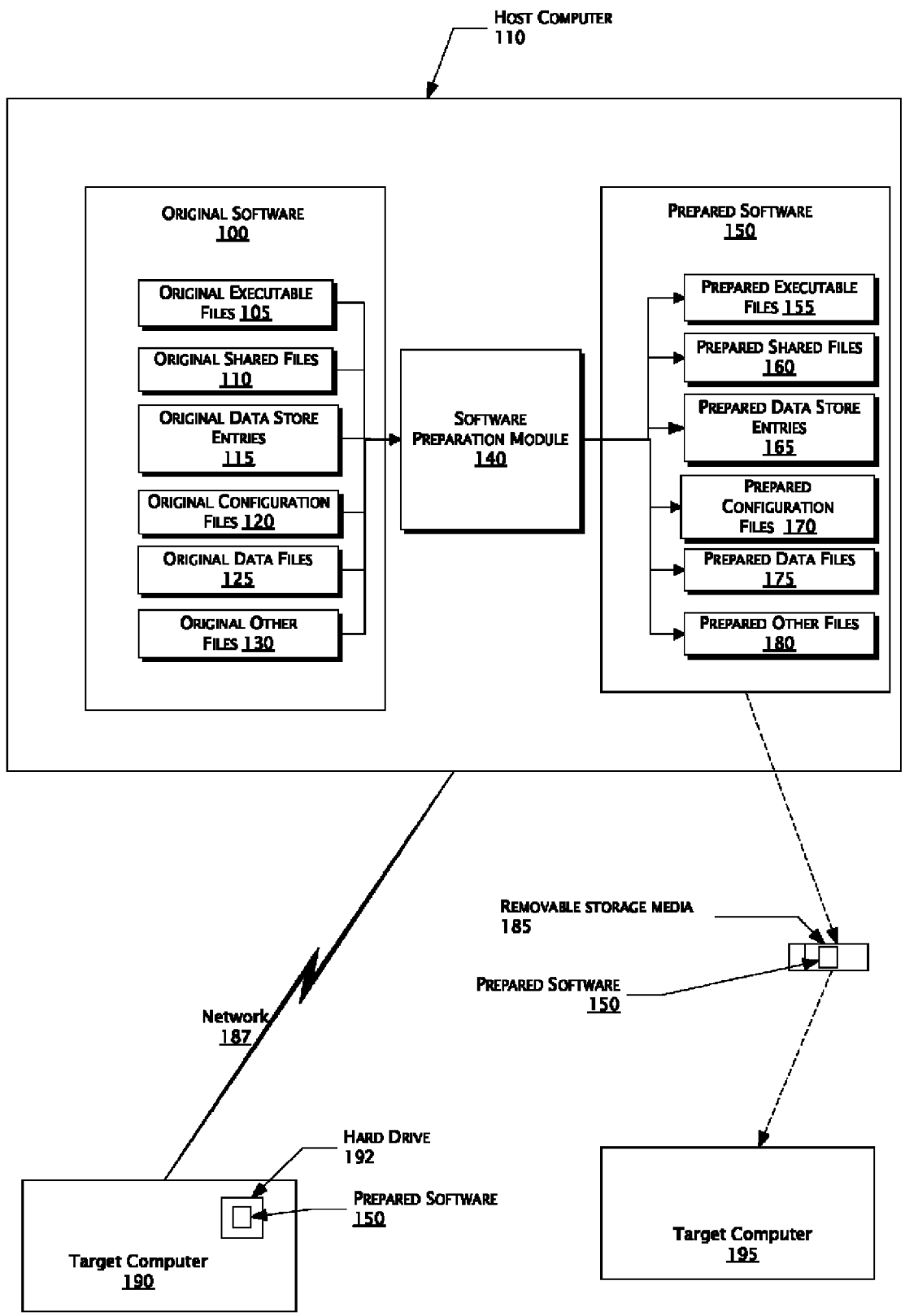
FIG. 1 is a block diagram of an example of an operating environment in which software execution with minimal impact deployment may be carried out.

FIG. 1 is a generalized representation of a suitable operating environment 100 in which software execution with minimal impact deployment may be carried out. The operating environment 100 includes host computer 110, and one or more target computers 150 and 170.

Host computer 110 includes software preparation module 140. Software preparation module 140 may perform a process similar to that shown in FIG. 3, which prepares software to execute with minimal impact deployment. Generally, software preparation module 140 will process original software 100 to produce prepared software 150, which may be executed on a target computer without the prepared software requiring installation on the target computer. By way of example, and not limitation, software preparation module 140 may parse, or read, files which make up the original software 100, and determine what other files, system settings, or other information the software requires to execute properly. Software preparation module 140 may then copy all of the required files, system settings, and information to a common location, which may be on a hard drive (not shown) on host computer 110. Software preparation module 140 may then update any references in the copy of the software to reference the copies of the required files, system settings, and other information in the common location. The resulting prepared software 150 may include executable files, shared files, data files, data store entries, configuration files, and other files.

In this example, host computer 110 has original software 100 installed. Original software 100 in this example includes original executable files 105, original shared files 110, original data store entries 115, original configuration files 120, original data files 125, and original other files 130. Original software 100 is processed by software preparation module 140, which outputs prepared software 150. In this example, prepared software 150 includes prepared executable files 155, prepared shared files 160, prepared data store entries 165, prepared configuration files 170, prepared data files 175, and prepared other files 180.

The prepared software 150 may be executed on a target computer that has access to the common location, or a copy of the common location. In one implementation, target computer 190 includes hard drive 192, and is coupled to host computer 110 via a network 187. Target computer 190 may copy the prepared software files 150 over network 187 to hard drive 192. Once the prepared software 150 is copied to hard drive 192, it may be executed. In an alternate implementation, target computer 150 may execute prepared software 150 that has been made available, or shared, on host computer 110 without copying the prepared software 150 to hard drive 192. Network 187 may include a wired connection, wireless nodes, routers, hubs, and any number of other network devices, as well as other computers. Such networking environments are commonplace in offices, enterprise-wide computer networks, intranets and the Internet.

In another example implementation, prepared software 150 prepared by host computer 110 are copied to removable storage media 185. Removable storage media 185 is then coupled to target computer 195 to allow the prepared software 150 to be executed without first being installed. Removable storage media include media implemented in any method or technology. Removable storage media includes, but is not limited to, flash memory, such as flash drives, or other memory technology, CD-ROM, digital versatile disks (DVD) or other optical disk storage, magnetic cassettes, magnetic tape, magnetic disk storage or other magnetic storage devices.

Figure 2:
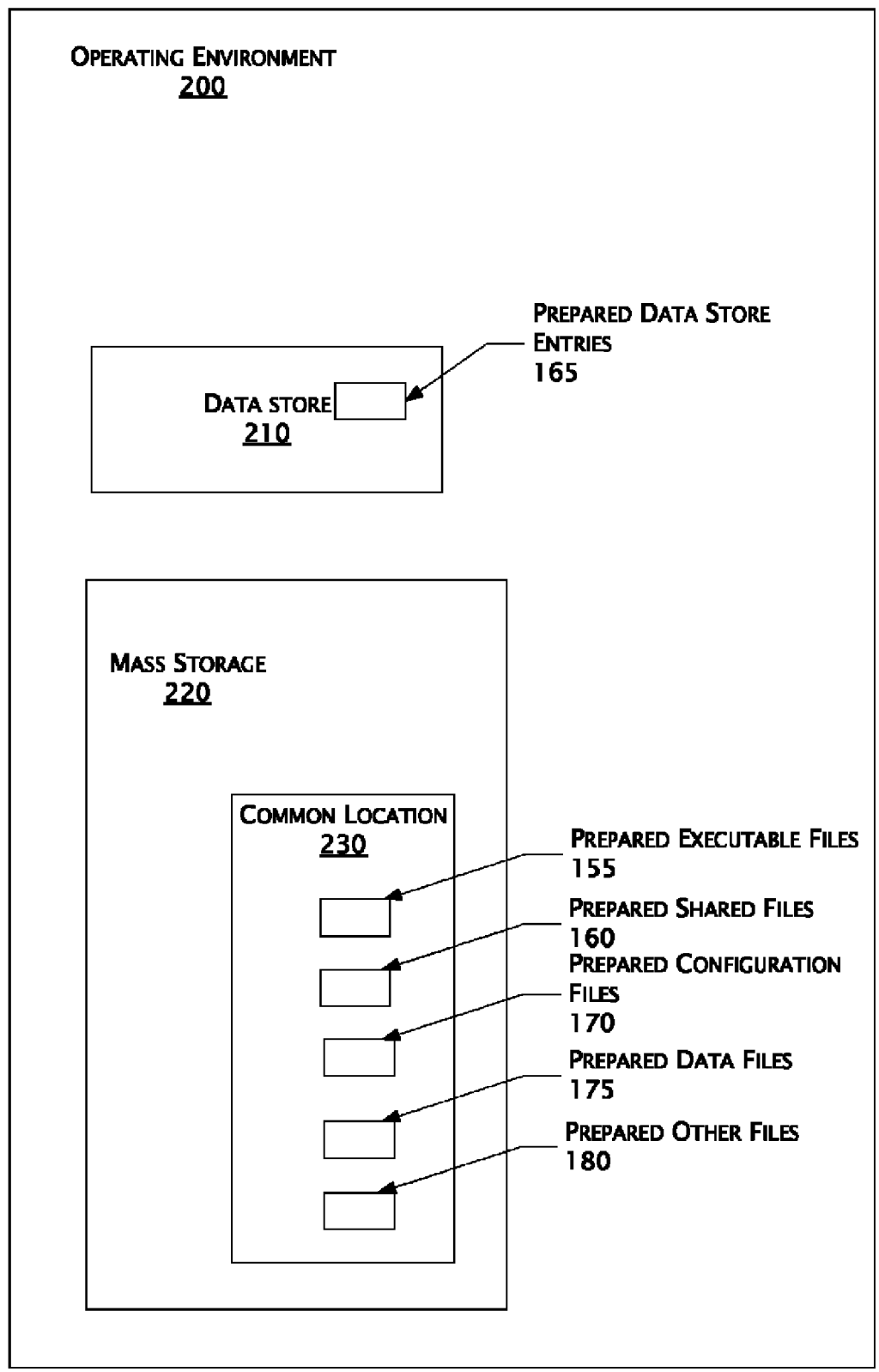
FIG. 2 is a block diagram of an example of an operating environment for executing prepared software.

FIG. 2 is a block diagram illustrating an example of an operating environment 200 for executing prepared software. Operating environment 200 may be found on target computers 190 and 195. Operating environment 200 includes data store 210 and mass storage 220.

Mass storage 220 contains a common location 230. Common location 230 contains prepared executable files 155, prepared shared files 160, prepared configuration files 170, prepared data files 175, and prepared other files 180. Prepared executable files 155 may include, but are not limited to, executable files, dll's, or the like included with the prepared software. Prepared shared files 160 may include, but are not limited to, dll's that were included with the operating system or any other files the prepared software may require to provide functionality. Prepared configuration files 170 may include configuration information used by the prepared software 150 to determine which directory to use for data files, which default font to use in an editor, or any other settings that may be saved and used by the software. Common location 230 may include one or more directories within a conventional file system, may be implemented as a file within a conventional file system, or may be implemented using any technology or combination or technologies providing similar functionality.

Data store 210 contains prepared data store entries 165, which may be stored or retrieved by the prepared software 150. Prepared data store entries 165 may include configuration information such as location or version information for the files that make up the prepared software. In an alternate implementation, configuration information may be stored in configuration file 170 and a data store 210 may not be used. In another implementation, the prepared data store entries 165 may also include configuration information, and there may not be any configuration files 170. In yet another implementation, the configuration information may be split between data store 210 and configuration file 170.

Data store 210 may be implemented in many different ways. In at least one implementation, data store 210 is provided and maintained by an operating system, with application programming interfaces available to write or read data stored therein. In another implementation, the prepared software creates and maintains a data store. Data store 210 may be made up of several files, databases, or other forms of data stores, and combinations thereof. Any technique for storing and retrieving configuration information may be used for data store 210. Data store 210 may be stored on mass storage 220, in memory, such as RAM, or may be stored and maintained in any manner providing similar functionality. In at least one implementation, data store 210 will have some areas that require elevated or administrative rights to update, while other areas will not require elevated rights to update.

Figure 3:
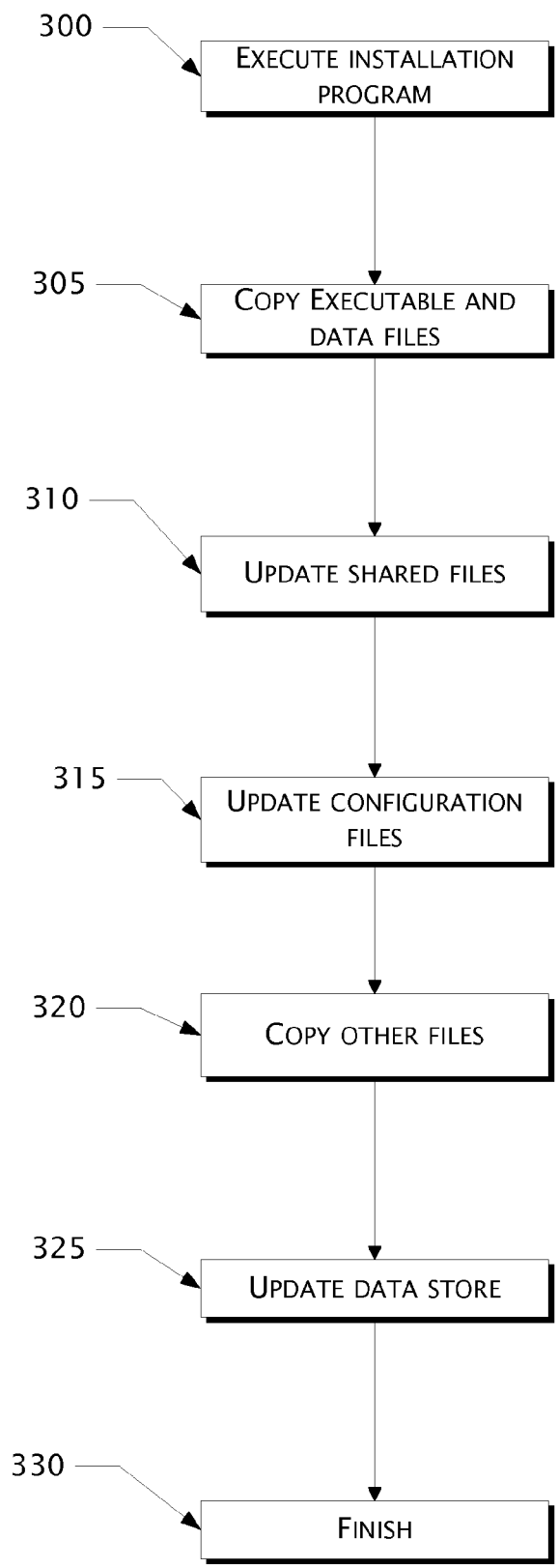
FIG. 3 is a flow chart of an example method for installing original software.
Figure 4:
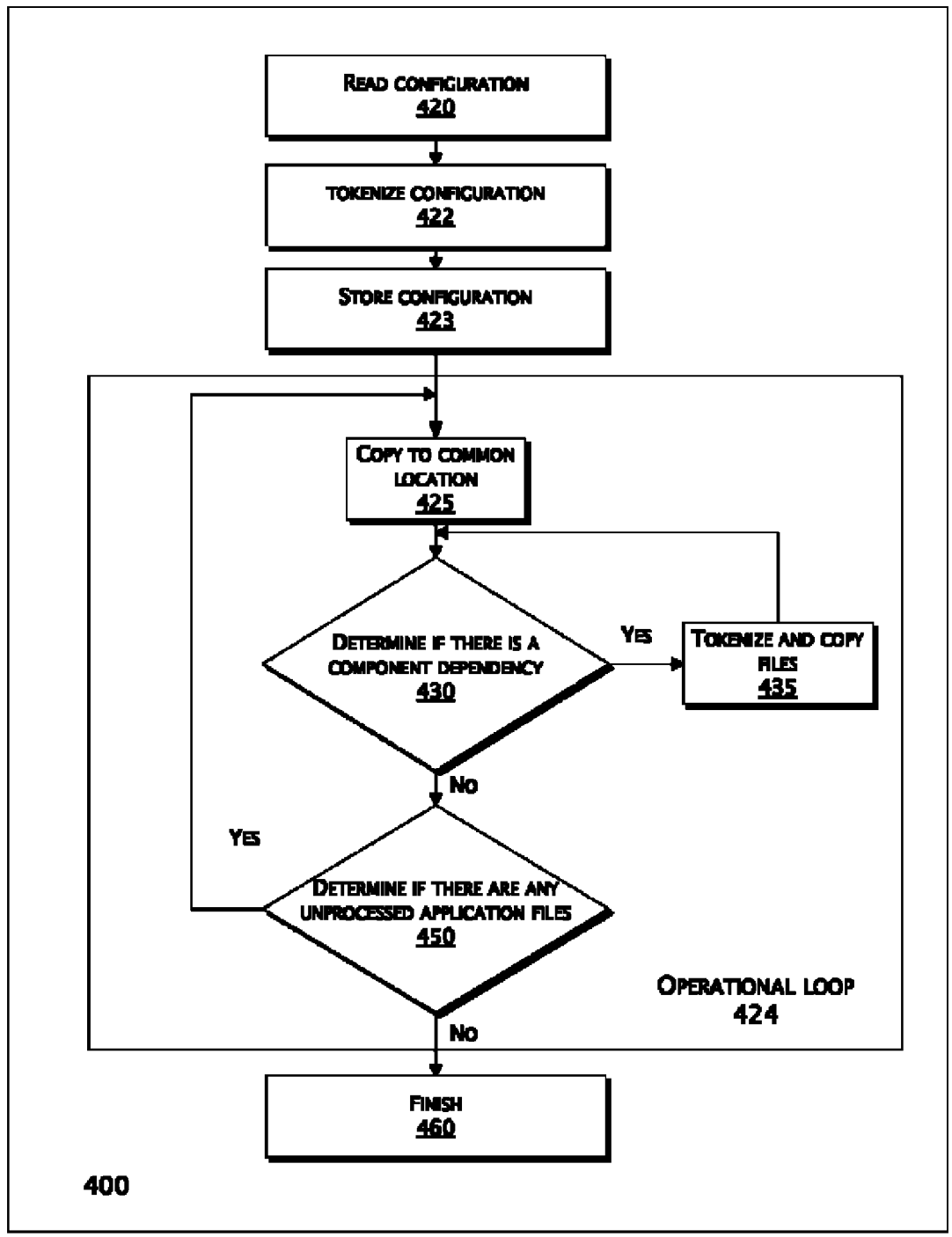
FIG. 4 is a flow chart of an example method for preparing original software to later permit software execution with minimal impact deployment.
Figure 5:
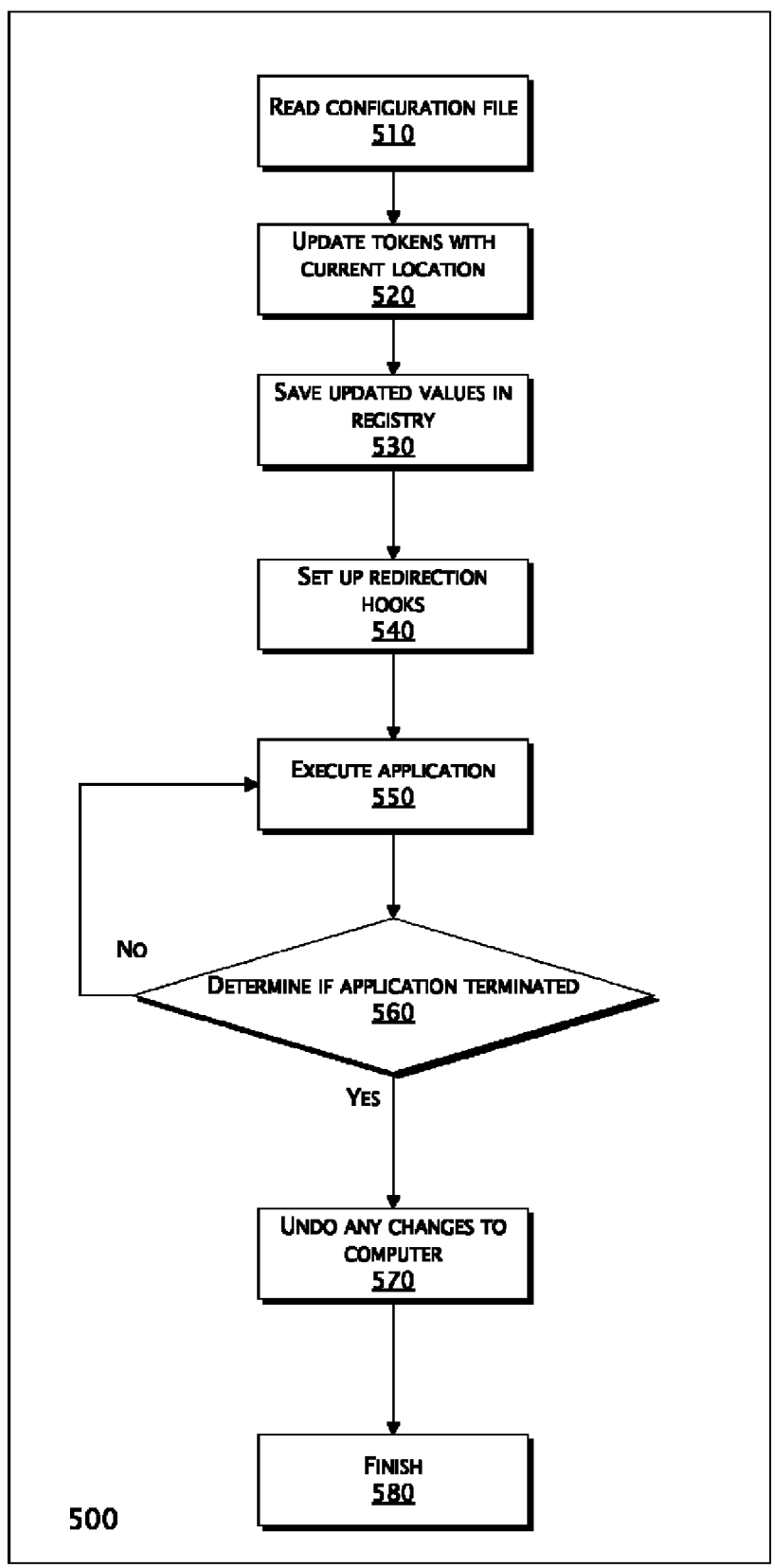
FIG. 5 is a flow chart showing an example of a method for running prepared software with minimal impact deployment.

FIGS. 3 through 5 are flow charts of example processes to implement software execution with minimal impact deployment. It should be understood that while the operational flow of these figures indicate a particular order of operations, in other implementations the operations may be ordered differently. Similarly, operational flows according to other embodiments need not be restricted to, or include all of, the specific operations described with respect to these figures.

To create prepared software 150, the original software 100 is first installed. FIG. 3 is a flow chart showing an example original software installation process. In this example, a conventional installation program is executed 300. The installation program then copies 305 executable files 105 and data files 125 for the original software 100 to a common location.

Some files, such as dll's, may be installed in a shared directory so that other software may use the same copy. If the original software being installed includes a different version of a shared dll than the version currently in the shared directory, the shared dll is updated 310. Configuration files are updated 315, and any other files that may be associated with the original software are copied 320. A data store is then updated 325. This data store update may include such information as which directory the executable files and data files have been installed in, what dynamic link libraries (dlls) or other dependencies the software may have, what functions the software exposes to other applications, or any other configuration information. This configuration information may also be stored in one or more configuration files instead of, or in addition to, the data store, or may be split between both one or more configuration files and the data store. Once any updates to the data store are complete, the installation is finished 330.

After the installation is finished, the software is executed and any additional configuration information is saved. Additional configuration information may include a default font or a default author's name for a word processor, for example.

Configuration information may be saved in a data store, in one or more files in the common location, a combination of data stores and files, or the like.

FIG. 4 is a flow chart of an example method 400 to preprocess, or prepare, original software 100 to later permit software execution with minimal impact deployment. First, the configuration information for the original software is read 420 from the application's configuration files. Hard coded paths are tokenized 422, and the tokenized paths and other configuration information are stored 423 in one or more configuration files.

The software may have associated therewith one or more files, such as executable files, dynamic link libraries (dll's), data files, or the like. An operational loop 424 is executed for each of the software files.

A file for the original software is copied 425 to the common location. The file is then examined to determine 430 if there is a dependency on another file, "a dependent file", such as a dll, a runtime library file, or any other component file. If there is a dependency, the file on which there is a dependency is tokenized and copied 435 to the common location. If any of these dependencies refer to absolute paths in a data store, the paths are tokenized. As an example, a path originally set to a MICROSOFT® WINDOWS® registry entry of "HKEY_LOCAL_MACHINE\Software\SomeValue" may be replaced with "ZeroSetupRoot\Software\SomeValue." Determining 430, and tokenizing and copying 435, are repeated until all file dependencies are copied locally. Determining 430 may be performed by parsing text, comparing binary data with a known set of binary data, or any other process for pattern matching, or by reading data at a known offset within a file. The data used by determining 430 may be contained within a file which has the dependency, within a file associated with the file that has the dependency, or within any other file associated with the original software.

A determination 450 is made as to whether there are files included in the original software or in the dependent files that have not yet been processed. If so, operational loop 424 is repeated for all unprocessed files. When it is determined 450 that there are no unprocessed files, the processing 400 finishes 460.

While this example shows processing for all files included with the original software, alternate implementations may allow selectively including or excluding files to be processed.

FIG. 5 is a flow chart showing an exemplary method 500 for running prepared software with minimal impact deployment on a target computer.

The configuration file created in step 423 of FIG. 4 is read 510, and tokens in it, if any, are updated 520 to reflect a current location of prepared software. The updated values are saved 530 in a section of a data store for which elevated or administrative rights are not required. Continuing with the MICROSOFT® WINDOWS® example above, a value of "ZeroSetupRoot\Software\SomeValue" in the tokenized data may be added as "HK_CURRENT_USER\Software\SomeValue" in the data store, assuming the "HK_CURRENT_USER" hive does not require elevated or administrative permission. In at least one alternate embodiment, the updated values are saved to a file rather than to the data store. In other embodiments, the updated values may be saved to a database, while in yet another embodiment the updated values may be saved through the use of a web service. One skilled in the art will appreciate that alternate methods and locations could be used to saving the updated values.

Once the data store is updated, redirection hooks for calls to the data store are set up 540. Any calls to restricted areas of the data store will be processed by the redirection hooks, with no changes to the calls in the original software, which continues executing 550 normally. The redirection hooks may be created during execution by trapping calls to particular application programming interfaces. For example, any call to read from one area of a data store may be intercepted and replaced with a call to read from a different area in the data store. Alternatively, the original software's executable code may be modified, with calls for reading configuration information from one area replaced with calls to get the configuration information from a different area.

The prepared software is executed 550, and continues execution until it is determined 560 to be terminated.

The application may terminate for a number of reasons. For example, a user may terminate it, the application may run until completion, or a system shutdown request may terminate the application. Any number of other conditions known in the art may cause the application to terminate. Once it is determined 560 that the application has terminated, changes that were made to the operating environment, such as updates to the data store, are undone 570 by removing any entries that had been placed in the data store while executing the target software. The process is then finished 580.

In at least one alternate implementation, some values may be persisted in the data store. In another implementation, software may be slightly modified to prepare for software execution with minimal impact deployment, by adding programming instructions to allow for easier hooking of the data store calls.

While FIG. 5 has been described using the prepared software from the process of FIG. 4, one skilled in the art will appreciate that other processes may have been used to prepare the software.

Figure 6:
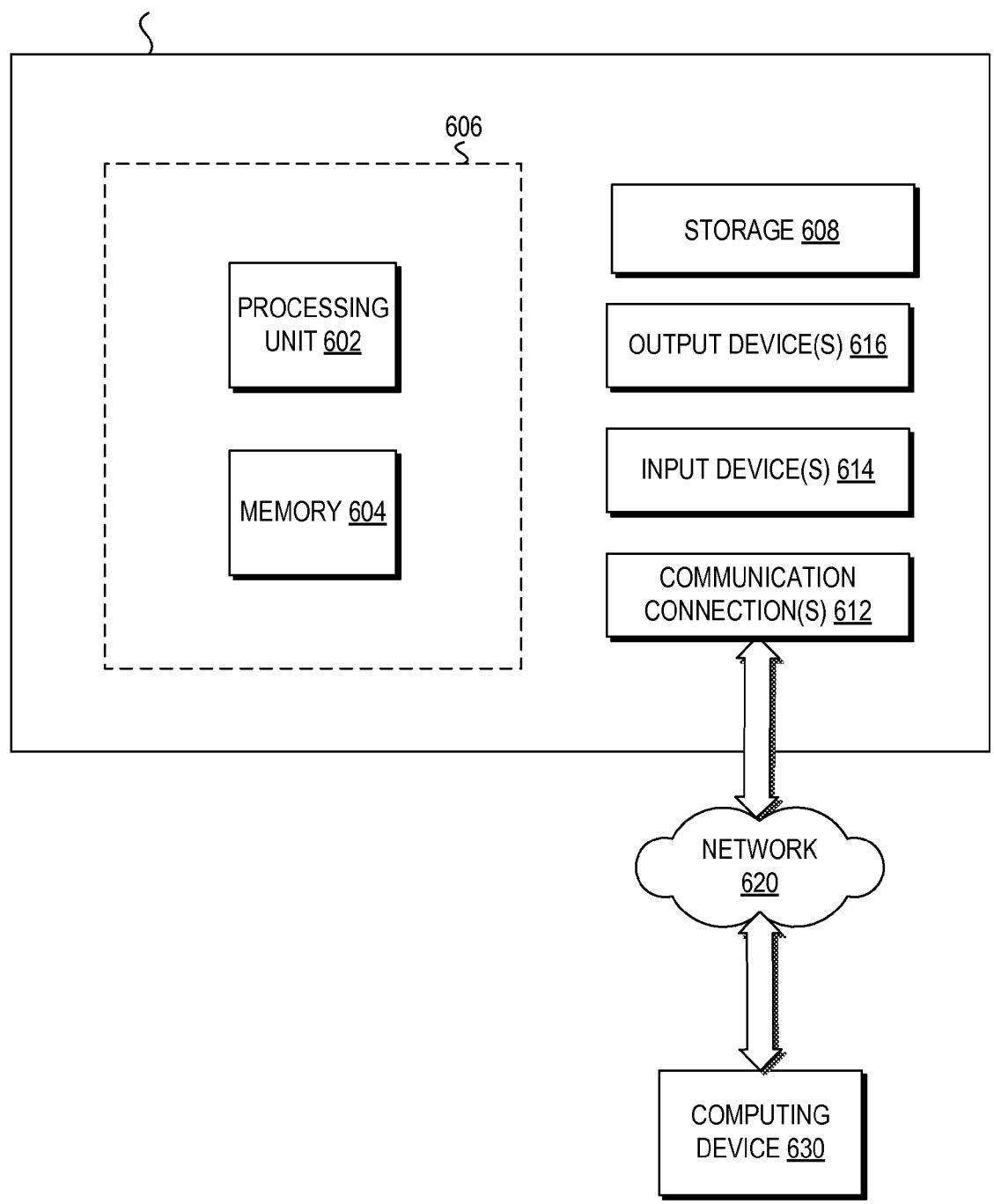
FIG. 6 is a block diagram of an example of a system on which software execution with minimal impact deployment may be implemented.

FIG. 6 and the following discussion are intended to provide a brief, general description of a suitable computing environment to implement embodiments of techniques and technologies for software execution with minimal impact deployment. The operating environment of FIG. 6 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 shows an example of a computing device 600 for implementing one or more embodiments of the invention. In one configuration, computing device 600 includes at least one processing unit 602 and memory 604. Depending on the exact configuration and type of computing device, memory 604 may be volatile (such as RAM), non-volatile (such as ROM, flash memory, etc.) or some combination of the two. This configuration is illustrated in FIG. 6 by dashed line 606.

In other embodiments, device 600 may include additional features and/or functionality. For example, device 600 may also include additional storage (e.g., removable and/or non-removable) including, but not limited to, magnetic storage, optical storage, and the like. Such additional storage is illustrated in FIG. 6 by storage 608. In one embodiment, computer readable instructions to implement embodiments of the invention may be in storage 608. Storage 608 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 604 and storage 608 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 600. Any such computer storage media may be part of device 600.

Device 600 may also include communication connection(s) 612 that allow device 600 to communicate with other devices. Communication connection(s) 612 may include, but is not limited to, a modem, a Network Interface Card (NIC), or other interfaces for connecting computing device 600 to other computing devices. Communication connection(s) 612 may include a wired connection or a wireless connection. Communication connection(s) 612 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 600 may include input device(s) 614 such as keyboard, mouse, pen, voice input device, touch input device, infrared cameras, video input devices, and/or any other input device. Output device(s) 616 such as one or more displays, speakers, printers, and/or any other output device may also be included in device 600. Input device(s) 614 and output device(s) 616 may be connected to device 600 via a wired connection, wireless connection, or any combination thereof. In one embodiment, an input device or an output device from another computing device may be used as input device(s) 614 or output device(s) 616 for computing device 600.

Components of computing device 600 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 600 may be interconnected by a network. For example, memory 604 may be comprised of multiple physical memory units located in different physical locations interconnected by a network.

Those skilled in the art will realize that storage devices utilized to store computer readable instructions may be distributed across a network. For example, a computing device 630 accessible via network 620 may store computer readable instructions to implement one or more embodiments of the invention. Computing device 600 may access computing device 630 and download a part or all of the computer readable instructions for execution. Alternatively, computing device 600 may download pieces of the computer readable instructions, as needed, or some instructions may be executed at computing device 600 and some at computing device 630. Those skilled in the art will also realize that all or a portion of the computer readable instructions may be carried out by a dedicated circuit, such as a Digital Signal Processor (DSP), programmable logic array, and the like.

The invention claimed is:

1. A method of preparing software for execution with minimal impact deployment comprising:
   executing an installation application which installs one or more original software files and writes configuration information associated with the one or more original software files to a restricted-access area of a data store;
   examining the configuration information to find references to resources included in the original software files;
   creating one or more configuration files that include the configuration information such that the references to the resources included in the original software files are replaced with tokens;
   finding references to dependencies on the resources included in the one or more original software files;
   creating prepared files by copying at least one of the resources included in the one or more original software files to the data store, wherein at least one of the references to dependencies on the at least one copied resource is replaced with tokens; and
   assembling the prepared files and one or more configuration files to provide prepared software.

2. The method of claim 1 wherein the dependencies refer to settings for the original software.

3. The method of claim 1 wherein the dependencies refer to locations for files on which the original software depends.

4. The method of claim 1 wherein the finding references to dependencies is done by comparing binary data in the software file to a known set of binary data.

5. The method of claim 1 wherein the finding references to dependencies is done by parsing text.

6. The method of claim 1 wherein the finding references is done by reading data from a file at known offset within the file.

7. A non-transitory computer readable medium having instructions thereon that, when executed, perform the steps of:
   executing an installation application which installs one or more original software files and writes configuration information associated with the one or more original software files to a restricted-access area of a data store;
   examining the configuration information to find references to resources included in the original software files;
   creating one or more configuration files that include the configuration information such that the references to the resources included in the original software files are replaced with tokens;
   finding references to dependencies on the resources included in the one or more original software files;

creating prepared files by copying at least one of the resources included in the one or more original software files to the data store, wherein at least one of the references to dependencies on the at least one copied resource is replaced with tokens; and assembling the prepared files and one or more configuration files to provide prepared software.

8. A method comprising:

receiving original configuration information containing one or more tokens, wherein the original configuration information associated with an original software file;

providing updated configuration information by updating the one or more token to correspond to an operating environment;

copying at least one resource included in the original configuration information, wherein the original configuration information references a dependence of the original configuration information on at least one copied resource;

storing the updated configuration information into a data store, wherein the updated configuration information included the at least one copied resource;

replacing requests to obtain data from the original configuration information with requests to obtain data from the updated configuration information during execution of a software application in the operating environment; and removing the updated configuration information from the data store after the software application execution terminates.

9. The method of claim 8 wherein the updated configuration information is stored in a file.

10. The method of claim 8 wherein the updated configuration information is stored in a data store.

11. The method of claim 8 wherein the updated configuration information is stored in a system registry.

12. The method of claim 8 wherein the updated configuration information includes settings for the software application.

13. The method of claim 8 wherein the updated configuration information includes locations for files on which the software application depends.

* * * * *